(12) United States Patent
Kan et al.

(10) Patent No.: US 9,083,570 B2
(45) Date of Patent: Jul. 14, 2015

(54) LEVEL EQUALIZATION TO COMPENSATE FOR IMPLEMENTATION IMPAIRMENTS IN OPTICAL COMMUNICATION SYSTEMS WITH HIGH-ORDER MODULATIONS

(71) Applicant: Futurewei Technologies, Inc., Plano, TX (US)

(72) Inventors: Clarence Kan, Bridgewater, NJ (US); Zhihong Li, San Jose, CA (US); Fei Zhu, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 8 days.

(21) Appl. No.: 14/089,357

(22) Filed: Nov. 25, 2013

(65) Prior Publication Data

US 2014/0147111 A1 May 29, 2014

Related U.S. Application Data

(60) Provisional application No. 61/731,301, filed on Nov. 29, 2012.

(51) Int. Cl.
*H04B 10/079* (2013.01)
*H04L 27/01* (2006.01)
(Continued)

(52) U.S. Cl.
CPC .............. *H04L 27/01* (2013.01); *H04B 10/613* (2013.01); *H04B 10/614* (2013.01); *H04B 10/616* (2013.01); *H04L 25/03012* (2013.01); *H04L 25/03159* (2013.01)

(58) Field of Classification Search
CPC .. H04B 10/60; H04B 10/616; H04B 10/6162; H04B 10/672; H04B 10/697; H04B 10/6971; H04B 10/25073; H04B 10/294; H04B 10/2941; H04B 10/613; H04B 10/614; H04L 27/01; H04L 27/03159; H04L 27/03012
USPC ............ 398/65, 152, 202, 204–206, 208–210
See application file for complete search history.

(56) References Cited

U.S. PATENT DOCUMENTS

| | | | |
|---|---|---|---|
| 2005/0123032 A1* | 6/2005 | Chen .............................. | 375/229 |
| 2011/0305453 A1* | 12/2011 | Hauske et al. ................... | 398/38 |
| 2012/0133411 A1* | 5/2012 | Miao et al. ...................... | 327/306 |

OTHER PUBLICATIONS

Chiba, A., et al., "Adaptive Symbol Discrimination Method for Distorted Multi-Level Optical Signal and its Application to Decoding of High-Speed Optical Quadrature Amplitude Modulation," Conference on Optical Fiber Communication/National Fiber Optic Engineers Conference, Feb. 24-28, 2008, 3 pages.

(Continued)

*Primary Examiner* — Dalzid Singh
(74) *Attorney, Agent, or Firm* — Conley Rose, P.C.; Grant Rodolph; Brandt D. Howell (57) ABSTRACT

A method comprising receiving digital samples from an optical communication system, assigning the samples into bins based on signal levels of the samples, computing an average signal level for each bin, determining a level adjustment transformation function for the samples based on the average signal levels of the bins, and applying the level adjustment transformation function to the samples. Also, disclosed is an optical receiver comprising a frontend configured to receive an optical signal over an optical channel, and convert the optical signal into a plurality of sequences of digital samples, and a processor coupled to the frontend and configured to perform a channel equalization on the samples of the sequences, assign the channel equalized samples of each sequence into bins based on signal levels of the channel equalized samples, determine a level adjustment transformation function for each sequence, and apply the level adjustment transformation function to each sequence.

18 Claims, 6 Drawing Sheets

(51) Int. Cl.
  *H04B 10/61* (2013.01)
  *H04L 25/03* (2006.01)

(56) References Cited

OTHER PUBLICATIONS

Saifuddin, F., Md., "Compensation of Quadrature Imbalance in an Optical 16-QAM Digital Coherent Receiver," Proceedings of 14th International Conference on Computer and Information Technology, ICCIT 2011, Dept. of Electrical and Electronic Engg., Dhaka University of Engineering and Technology, Gazipur, Bangladesh, Dec. 22-24, 2011, 4 pages.

Savory, S.J., "Digital Equalisation of 40 Gbit/s Per Wavelength Transmission Over 2480km of Standard Fibre Without Optical Dispersion Compensation," ECOC 2006, European Conference on Optical Communications, Sep. 24-28, 2006, 2 pages.

Foreign Communication From a Counterpart Application, PCT Application No. PCT/US2013/071729, International Search Report dated Mar. 3, 2014, 4 pages.

Foreign Communication From a Counterpart Application, PCT Application No. PCT/US2013/071729, Written Opinion dated Mar. 3, 2014, 7 pages.

\* cited by examiner

LEVEL EQUALIZATION TO COMPENSATE FOR IMPLEMENTATION IMPAIRMENTS IN OPTICAL COMMUNICATION SYSTEMS WITH HIGH-ORDER MODULATIONS

CROSS-REFERENCE TO RELATED APPLICATIONS

The present application claims priority to U.S. Provisional Patent Application 61/731,301, filed Nov. 29, 2012 by Clarence Kan, et. al., and entitled "Method and Apparatus of Using Level Equalization to Compensate for Implementation Impairments in Optical Communication Systems Employing High-Order Modulations", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The employment of higher-order modulation in terabit optical fiber transmission systems may increase spectral efficiency and make better use of transmission capacity of fiber infrastructure. However, transmission signal quality and transmission channel impairments may affect performance of higher-order modulation systems. Advances in high speed analog-to-digital converters (ADCs) and deep submicron semiconductor processing technologies in digital signal processors (DSPs) may enable advanced digital signal processing techniques to be applied for signal conditioning and/or distortion compensation at optical transmitters and/or receivers.

SUMMARY

In one embodiment, the disclosure includes a method comprising receiving digital samples from an optical communication system, assigning the samples into bins based on signal levels of the samples, computing an average level for each bin, determining a level adjustment transformation function for the samples based on the average signal levels of the bins, and applying the level adjustment transformation function to the samples.

In another embodiment, the disclosure includes an optical receiver comprising a frontend configured to receive an optical signal from an optical transmitter over an optical channel, and convert the optical signal into a plurality of sequences of digital samples, and a processor coupled to the frontend and configured to perform a channel equalization on the samples of the sequences, assign the channel equalized samples of each sequence into bins based on signal levels of the channel equalized samples, compute an average signal level in each bin for each sequence, determine a level adjustment transformation function for each sequence based on the average signal levels of each sequence, and perform a level equalization on each sample of each sequence by applying the level adjustment transformation function.

In yet another embodiment, the disclosure includes an optical communication apparatus comprising a level separator coupled to a time domain equalizer and configured to receive a sequence of digital samples from the time domain equalizer, and assign the samples into bins based on signal levels of the samples, a level adjustment generator coupled to the level separator and configured to compute an average signal level for each bin, and determine a level adjustment transformation function based on the average signal levels, and a level adjustment unit coupled to the time domain equalizer and the level adjustment generator and configured to receive the samples from the time domain equalizer, and apply the level adjustment transformation function to the samples.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Optical communication systems may employ higher-order modulation to meet the growing demand for higher transmission capacity. A high-order modulated signal (e.g. 16 Quadrature Amplitude Modulation (16QAM)) may comprise an In-phase (I) component and a Quadrature-phase (Q) component, where each component may comprise more than two signal levels. To further increase spectral efficiency, optical communication systems may employ polarization multiplexing by mapping two data streams to two orthogonal polarizations (e.g. PM-16QAM). In an optical communication system, an optical transmitter may modulate data according to a designed modulation format (e.g. amplitude, phase, and/or polarization) and transmit a modulated optical signal, an optical channel may transport the modulated optical signal from the optical transmitter to an optical receiver, and the optical receiver may receive the optical signal and recover the transmitted data. However, the received signal may differ from the original signal designed at the optical transmitter by amplitudes (e.g. signal levels), phases, and/or polarizations due to transmission channel impairments and implementation imperfections. A typical DSP-based coherent optical receiver may employ a frequency domain equalizer (FDEQ) and/or a time domain equalizer (TDEQ) to compensate for signal distortions. The original data may then be recovered from the frequency and time domain equalized signal at a slicer, where the ideal transmitted level may be estimated based on amplitude and/or phase of the equalized signal.

The FDEQ and TDEQ may compensate for transmission channel impairments, but may not correct implementation imperfections. Implementation related impairments may be caused by optical and electrical components with limited bandwidths, data converters and data drivers with non-linear responses, and/or imperfect bias for IQ amplitude and phase controls. The imperfections in implementation may degrade signal quality and lead to higher BER, and thus may lower system performance. In a higher-order modulation system, signals are more densely packed in terms of amplitudes and phases. Thus, a higher-order modulation system may be more prone to transmission errors and may have a higher BER error floor than a lower-order modulation system. DSP techniques may be employed for compensating implementation impairments at a transmitter and/or at a receiver. For example, one algorithm may attempt to adaptively modify decision thresholds for IQ map distorted Quadrature Amplitude Modulation (QAM) symbols and another algorithm may attempt to compensate for IQ phase mismatch. However, the first algorithm may be computationally complex and may not be practical for product implementation. The second algorithm may only compensate for IQ phase mismatch and not for IQ amplitude mismatch, and thus may only provide little performance improvement. Alternative compensation techniques may be limited to compensating pre-defined impairments based on calibration data and may not consider time-variants, such as temperature variations, aging of components, and/or control errors.

Disclosed herein is a mechanism for level equalization to compensate for non-ideal signal levels due to implementation imperfections, which may improve BER performance in a high-order modulation optical communication system. In a transmitter of an optical communication system, data may be mapped to symbols according to a designed modulation format. In a receiver of an optical communication system, level equalization may be applied to correct signal levels of received samples. Level equalization may comprise designing signal level bins according to an expected modulation format (e.g. employed at the transmitter), assigning received samples to the bins based on signal levels of the received samples, determining a level adjustment transformation function to map an average signal level of each bin to an ideal signal level of the expected modulation format, and applying the level adjustment transformation function to each sample.

In an embodiment, the level adjustment transformation function may be determined by a polynomial function curve-fitting. After applying the level equalization, the level adjusted samples in each bin may have an average signal level about equal to a corresponding ideal signal level, thus decreasing the probability of incorrect slicing and improving BER performance. Level equalization may be applied to each component of each polarization separately. In an optical receiver, level equalizers may be positioned at the output of a TDEQ to further equalize signal levels. Alternatively, level equalizers may be positioned at the output of IQ equalizers that follow a TDEQ. BER performance may be improved by employing level equalizers at either placement.

Figure 1:
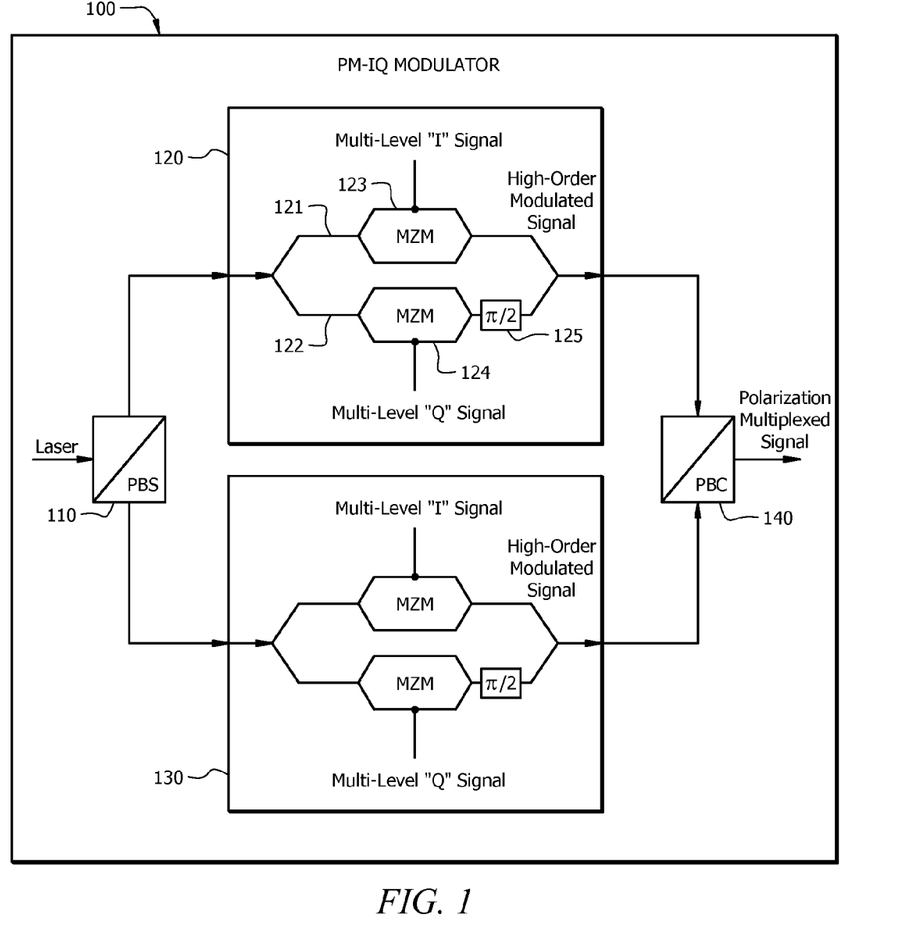
FIG. 1 is a schematic diagram of an embodiment of a Polarized Multiplexed (PM) In-phase Quadrature-phase (IQ) Modulator.

FIG. 1 is a schematic diagram of an embodiment of a PM-IQ modulator 100, which may modulate a light beam at an optical transmitter. The modulation may be imposed on amplitude, phase, and polarization. The PM-IQ modulator 100 may comprise a polarization beam splitter (PBS) 110, a first optical IQ modulator 120, a second optical IQ modulator 130, and a polarization beam combiner (PBC) 140. The PBS 110 may be coupled to the first optical IQ modulator 120 and the second optical IQ modulator 130. The first optical IQ modulator 120 and the second optical IQ modulator 130 may be coupled to the PBC 140.

The PBS 110 may be any optical device configured to split a light beam generated by a laser into two light beams and guide one light beam to the first optical IQ modulator 120 and another light beam to the second optical IQ modulator 130. The two light beams may be orthogonal, where one light beam may be an X-polarized optical signal and the other light beam may be a Y-polarized optical signal. For example, PBS 110 may couple the X-polarized optical signal to the input of the first optical IQ modulator 120 and the Y-polarized optical signal to the input of the second optical IQ modulator 130.

The first optical IQ modulator 120 may comprise two optical paths 121 and 122. The first optical path 121 may comprise a first Mach Zehnder modulator (MZM) 123 and the second optical path 122 may comprise a second MZM 124 and a phase shifter 125. The first and second MZM 123 and 124 may be configured to vary the power of a light beam according to a driving voltage. The phase shifter 125 may be configured to bias the voltage on the second optical path 122 to provide an optical phase-shift of ninety degrees compared with the first optical path 121. For example, the first optical path 121 and the second optical path 122 may generate an I component and a Q component of a modulated optical signal, respectively. The second optical IQ modulator 130 may be substantially similar to the first optical IQ modulator 120. The two optical IQ modulators 120 and 130 may be configured to modulate the X-polarized optical signal and the Y-polarized optical signal output by PBS 110, respectively.

The PBC 140 may be any optical device configured to generate a polarization multiplexed signal by combining modulated signals. For example, the PBC 140 may combine the X-polarized modulated optical signal from the first optical IQ modulator 120 and the Y-polarized modulated optical signal from the second optical IQ modulator 130.

The PM-IQ modulator 100 may be employed at an optical transmitter to generate a high-order modulation signal. The MZMs 123 and 124 in each of the IQ modulator 120 or 130 may be driven by a multi-level driving voltage, which may be controlled by a data generator. For example, a data generator may map data information to symbols according to a designed high-order modulation format, form multi-level I and Q signals in a digital domain, convert the digital I and Q signals into analog electrical signals via digital-to-analog converters (DACs), amplify the electrical signals via radio frequency (RF) amplifiers, and feed the multi-level electrical signals to the IQ modulators 120 and 130. Due to implementation imperfections, such as optical and/or RF components with limited bandwidth and/or non-linear responses, multi-level electrical signals with imperfect levels, and/or MZM bias drift, the transmitted and/or received signal may deviate from the designed levels despite of the best effort in signal pre-conditioning. For example, the I and Q branches may not have an ideal phase offset of ninety degrees and/or the I and Q amplitudes may not be at the ideal signal levels.

Figure 2:
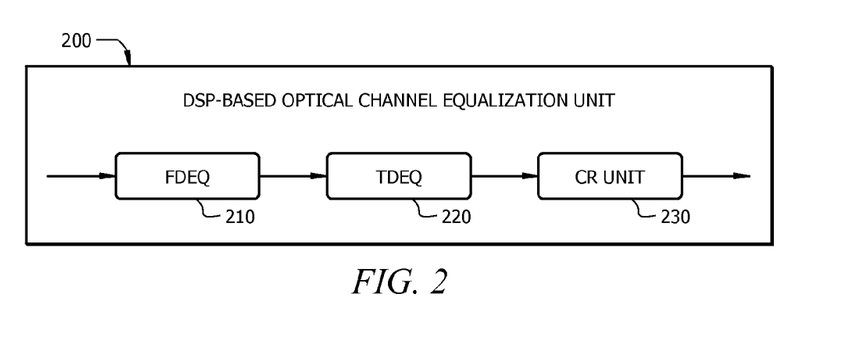
FIG. 2 is a schematic diagram of an embodiment of a DSP-based optical channel equalization unit.

FIG. 2 is a schematic diagram of an embodiment of a DSP-based optical channel equalization unit 200, which may be employed at a coherent optical receiver to compensate for transmission channel impairments. The DSP-based optical channel equalization unit 200 may be realized in one or more application specific integrated circuit (ASIC) DSPs hardware and/or implemented as DSP software components. The DSP-based optical channel equalization unit 200 may comprise a FDEQ 210, a TDEQ 220, and a carrier recovery (CR) unit 230. The DSP-based optical channel equalization unit 200 may be coupled to a front end configured to receive an optical signal (e.g. a dual-polarization signal with X and Y orthogonal polarizations) transported over an optical channel and convert the optical signal into a plurality of sequences of digital samples. The FDEQ 210 may be configured to receive the sequences of digital samples, compensate for fiber chromatic dispersion, and perform frequency filtering optimization including bandwidth compensation. The TDEQ 220 may be coupled to the FDEQ 210 and configured to recover the X and Y polarizations transmitted at the optical transmitter and compensate for inter-symbol interference and polarization mode dispersion. The CR unit 230 may be coupled to the TDEQ 220 and configured to recover the carrier phase.

Figure 3:
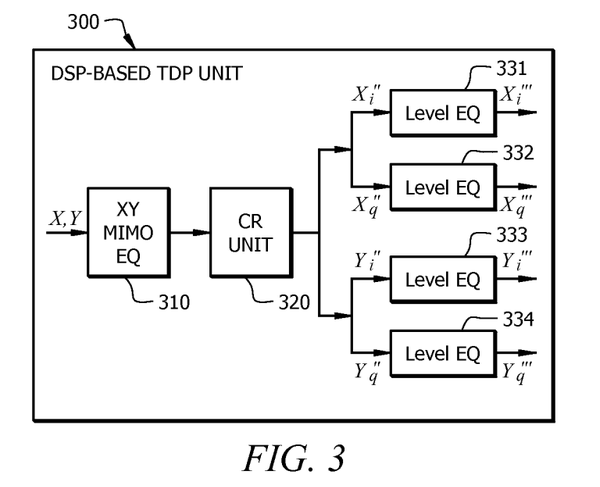
FIG. 3 is a schematic diagram of an embodiment of a DSP-based time domain processing (TDP) unit with level equalizers.
Figure 4:
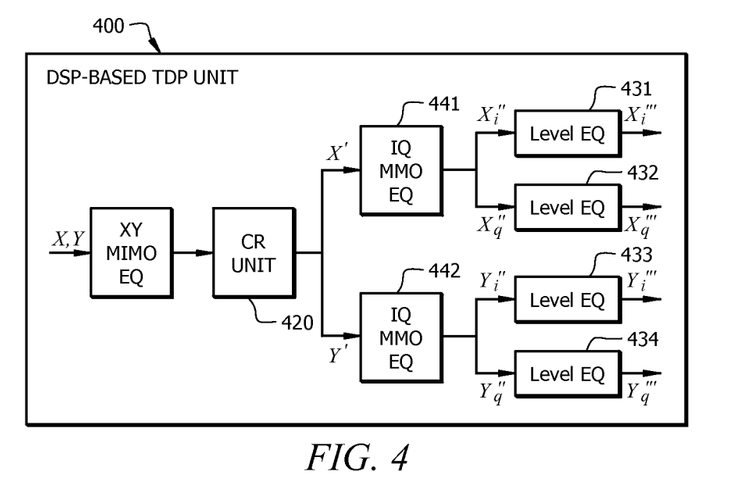
FIG. 4 is a schematic diagram of another embodiment of a DSP-based TDP unit with level equalizers.

The DSP-based optical channel equalization unit 200 may compensate for transmission channel impairments, but may not compensate for implementation imperfections. Additional equalizers (e.g. IQ equalizers and/or level equalizers) may be employed after the DSP-based optical channel equalization unit 200 to compensate for implementation imperfections. FIGS. 3 and 4 depict two different placements of level equalizers. Since level equalizations may be performed in a time domain, FIGS. 3 and 4 may illustrate level equalizers placements in a time domain processing chain. It should be noted that the time domain processing chain may be preceded by a FDEQ, such as FDEQ 210.

FIG. 3 is a schematic diagram of an embodiment of a DSP-based TDP unit 300 with level equalizers. The DSP-based TDP unit 300 may reside in a coherent optical receiver and may be realized in one or more ASIC DSPs hardware and/or implemented as DSP software components. The DSP-based TDP unit 300 may comprise an X-polarization Y-polarization (XY) multiple-input multiple-output (MIMO) equalizer 310, a CR unit 320, and level equalizers 331, 332, 333, and 334. The XY MIMO equalizer 310 may be employed as a TDEQ, such as TDEQ 220. The CR 320 unit may be coupled to the XY MIMO equalizer 310 and may be substantially similar to the CR unit 230. The output signals at the CR unit 320 may be time domain equalized and carrier phase recovered signals and may comprise an X polarization and a Y polarization. The X-polarization may comprise an I component (e.g. $X_i''$) and a Q component (e.g. $X_q''$). The Y-polarization may comprise an I component (e.g. $Y_i''$) and a Q component (e.g. $Y_q''$).

In DSP-based TDP unit 300, the four level equalizers 331, 332, 333, and 334 may be coupled to CR unit 320. The level equalizers 331, 332, 333, and 334 may be configured to compensate for signal level distortions caused by implementation imperfections. Level equalization may be performed separately on each signal component of each polarization. For example, the level equalizers 331, 332, 333, and 334 may be configured to equalize signal levels of the signal components $X_i''$, $X_q''$, $Y_i''$, and $Y_q''$, respectively.

FIG. 4 is a schematic diagram of another embodiment of a DSP-based TDP unit 400 with level equalizers. The DSP-based TDP unit 400 may be substantially similar to DSP-based TDP unit 300, but may comprise two additional IQ equalizers 441 and 442. Specifically, the two IQ equalizers 441 and 442 may be positioned between CR unit 420 and level equalizers 431, 432, 433, and 434. The IQ equalizers 441 and 442 may be configured to correct a phase deviation between an I component and a Q component of demultiplexed polarized signals (e.g. X' and Y'). For example, the IQ equalizer 441 may be configured to correct a phase deviation between the I and Q components in an X-polarization (e.g. X') and the IQ equalizer 442 may be configured to correct a phase deviation between the I and Q components in a Y-polarization (e.g. Y'). The level equalizers 431, 432, 433, and 434 may be coupled to the IQ equalizers 441 and 442 and configured to compensate for level distortions. For example, the level equalizers 431 and 432 may be coupled to IQ equalizer 441 and configured to compensate for level distortions in the IQ phase compensated X-polarization (e.g. $X_i''$, $X_q''$). Similarly, the level equalizers 433 and 434 may be coupled to the IQ equalizer 442 and configured to compensate for level distortions in the IQ phase compensated Y-polarization (e.g. $Y_i''$, $Y_q''$).

Figure 5:
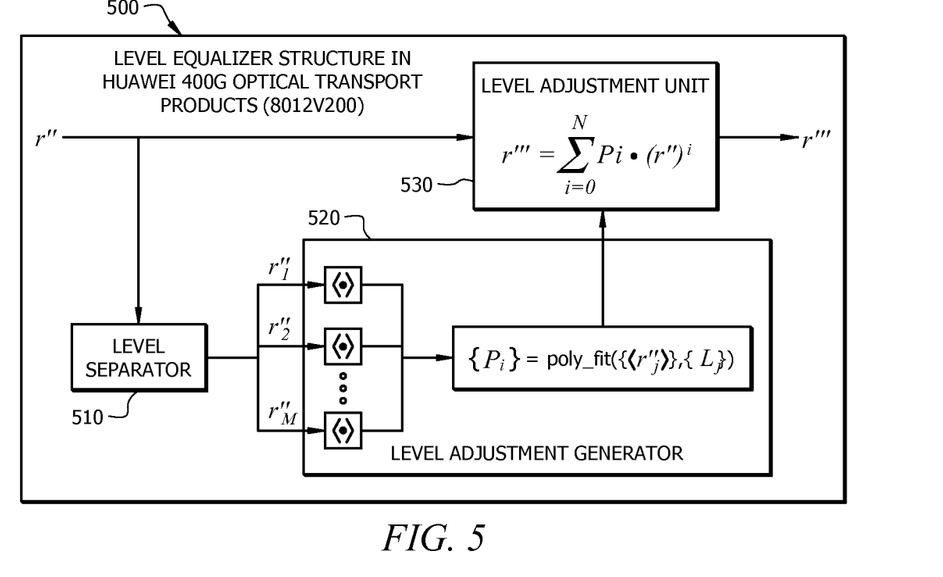
FIG. 5 is a schematic diagram of an embodiment of a level equalizer structure.

FIG. 5 is a schematic diagram of an embodiment of a level equalizer structure 500, which may be employed as a level equalizer, such as level equalizers 331, 332, 333, or 334 in DSP-based TDP unit 300 or level equalizers 431, 432, 433, or 434 in DSP-based TDP unit 400. The level equalizer structure 500 may comprise a level separator 510, a level adjustment generator 520, and a level adjustment unit 530. The level equalizer structure 500 may be configured to receive input samples with signal levels, denoted as r". The received samples may comprise data modulated with a designed modulation format and may be frequency domain equalized, time domain equalized, carrier phase recovered, and/or IQ phase corrected.

The level separator 510 may be configured to design signal level bins according to the designed modulation format and assign the input samples to the bins based on signal levels of the input samples. A modulated signal may have M number of ideal signal levels, denoted as $L_j$, where j may vary from about 1 to about M. As such, the level separator 510 may design M number of signal level bins that may be centered at about the ideal signal level $L_j$. The signal level bins may be separated by bin dividers positioned between the ideal signal levels (e.g. about $$\frac{L_j + L_{j+1}}{2},$$

about $$\frac{L_j + L_{j-1}}{2}).$$

For example, a 4-AM signal may have four ideal signal levels at about −3, about −1, about 1, and about 3. In this case, the level separator 510 may design four signal level bins. The first, second, third and fourth signal level bins centered at about −3, about −1, about 1, and about 3, respectively and the bin dividers may be positioned at about −2, about 0, and about 2.

The level adjustment generator 520 may be coupled to the level separator 510 and configured to compute an average signal level for the samples in each bin and determine a level adjustment transformation function. The level adjustment transformation function may map the average signal level of each bin to a corresponding ideal signal level. In one embodiment, the level adjustment transformation function may be an $N^{th}$ degree polynomial as shown below:

$$y(x) = \sum_{i=0}^{N} p_i \cdot (x)^i \quad (1)$$

where $p_i$ are the polynomial coefficients.

The polynomial coefficients $p_i$ may be determined by fitting a curve over a set of two-dimensional data points (e.g. $\{(x, y)\}$) with the ideal signal levels versus the average signal levels (e.g. $\{(\langle r_j'' \rangle, L_j)\}$), as shown below:

$$\{p_i\} = \text{poly\_fit}(\{\langle r_j'' \rangle\}, \{L_j\}) \quad (2)$$

where $\langle r_j'' \rangle$ is the computed average signal level for the $j^{th}$ bin, $L_j$ is the ideal signal level for the $j^{th}$ level and j may vary from about 0 to about M−1. It should be noted that the average signal level $\langle r_j'' \rangle$ may represent the average signal level of the input samples that may be determined to have a transmitted level of $L_j$ (e.g. decision at a QAM slicer).

The level adjustment unit 530 may be coupled to the level adjustment generator 520 and configured to apply the level adjustment transformation function to the input signal levels r″. For example, the input signal levels may be adjusted by computing the following equation:

$$r'''(k) = \sum_{i=0}^{N} p_i \cdot (r''(k))^i \quad (3)$$

where r″(k) is the received signal level of the $k^{th}$ input sample and r‴(k) is the adjusted signal level of the $k^{th}$ input sample. The average signal level in each bin after level equalization may be about equal to the corresponding ideal signal level.

Figure 6:
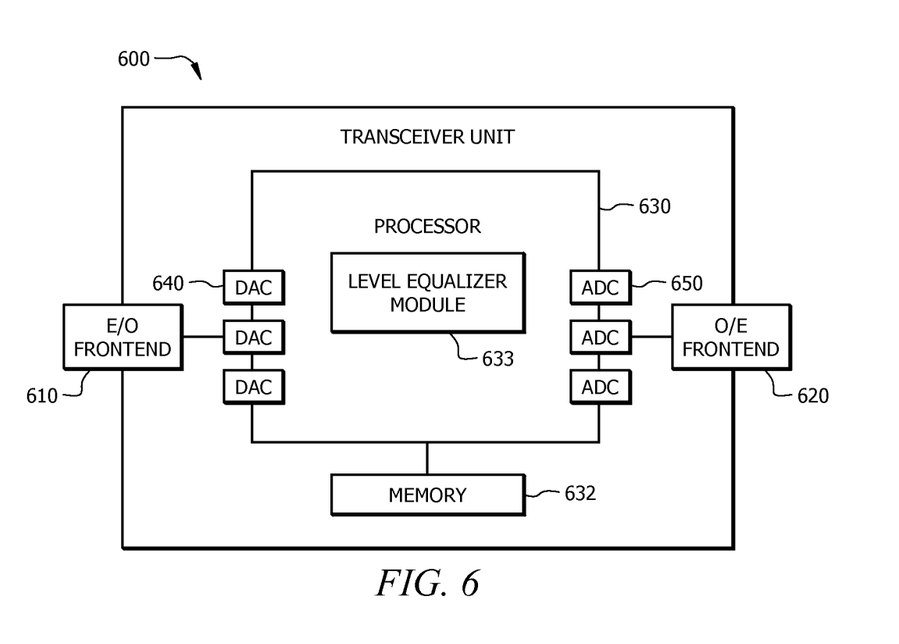
FIG. 6 is a schematic diagram of an embodiment of a transceiver unit.

FIG. 6 is a schematic diagram of an embodiment of a transceiver unit 600, which may be any device that transmits and/or receives optical signals with encoded data. For example, the transceiver unit 600 may be located in an optical transmission system, which may implement the level equalizer structure 500. The transceiver unit 600 may also be configured to implement or support any of the schemes described herein, such as the level equalization method 1000 described herein below. In some embodiments transceiver unit 600 may also act as other node(s) in an optical transport network (OTN), such as an optical line terminal (OLT), an optical network unit (ONU), and/or other optical network elements. One skilled in the art will recognize that the term transceiver unit encompasses a broad range of devices of which transceiver unit 600 is merely an example. Transceiver unit 600 is included for purposes of clarity of discussion, but is in no way meant to limit the application of the present disclosure to a particular transceiver unit embodiment or class of transceiver unit embodiments. At least some of the features/methods described in the disclosure may be implemented in a network apparatus or component such as a transceiver unit 600. For instance, the features/methods in the disclosure may be implemented using hardware, firmware, and/or software installed to run on hardware. As shown in FIG. 6, the transceiver unit 600 may comprise an electrical to optical (E/O) frontend 610 and/or an optical to electrical (O/E) frontend 620, which may convert an electrical signal to an optical signal for transmission in an OTN and/or receive an optical signal from the OTN and convert the optical signal to an electrical signal, respectively. A processor 630 may be coupled to the E/O frontend 610 and the O/E frontend 620 via a plurality of DACs 640 and ADCs 650, respectively, which may or may not be part of the processor 630. The DACs 640 may convert digital electrical signals generated by the processor 630 into analog electrical signals that may be fed into the E/O frontend 610. The ADCs 650 may convert analog electrical signals received from the O/E frontend 620 into digital electrical signals that may be processed by the processor 630. The processor 630 may comprise a level equalization module 633, which may implement the level equalization method 1000 at a receiver. The processor 630 may be coupled to one or more multi-core processors and/or memory modules 632, which may function as data stores, buffers, etc. Processor 630 may be implemented as a general processor or may be part of one or more ASICs and/or DSPs. In an alternative embodiment, the level equalization module 633 may be implemented as instructions stored in the memory module 632, which may be executed by processor 630. The memory module 632 may comprise a cache for temporarily storing content, e.g., a Random Access Memory (RAM). Additionally, the memory module 632 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the transceiver unit 600, at least one of the processor 630 and/or memory module 632 are changed, transforming the transceiver unit 600 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design, numbers of units to be produced, and/or clock speed requirements rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 7:
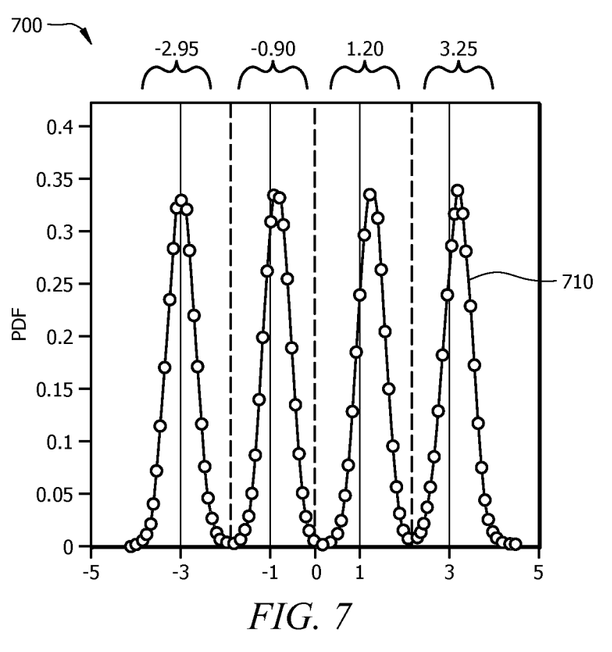
FIG. 7 illustrates an embodiment of a probability distribution function (PDF) curve of signal levels of a received 4-Amplitude Modulated (AM) signal.

FIG. 7 is a graph 700 illustrating a PDF curve 710 of signal levels of a received 4-AM signal. The x-axis may represent signal levels of samples received at the input of a level equalizer (e.g. level equalizer structure 500). The y-axis may represent a normalized distribution of the received signal levels. The solid lines may represent ideal signal levels (e.g. $L_j=\{-3, -1, 1, 3\}$) of a 4-AM signal and the dotted lines may represent bin dividers. For example, a level separator, such as level separator 510, may design four signal level bins for a received 4-AM signal, where the bins may be centered at about the ideal signal levels and separated by the bin dividers. As shown in curve 710, the received signal levels of the 4-AM signal may not be at the ideal signal levels, but may instead distribute around the ideal signal levels. In addition, the average received signal levels (e.g. $\langle r_j''\rangle = \{-2.95, -0.9, 1.2, 3.25\}$) or the peaks of the curve 710 may deviate from the ideal signal levels. The distributions around the ideal signal levels may be due to transmission channel noise and the deviations of average signal level from the ideal signal levels may be due to the implementation imperfections described herein above with respect to FIG. 1.

Figure 8:
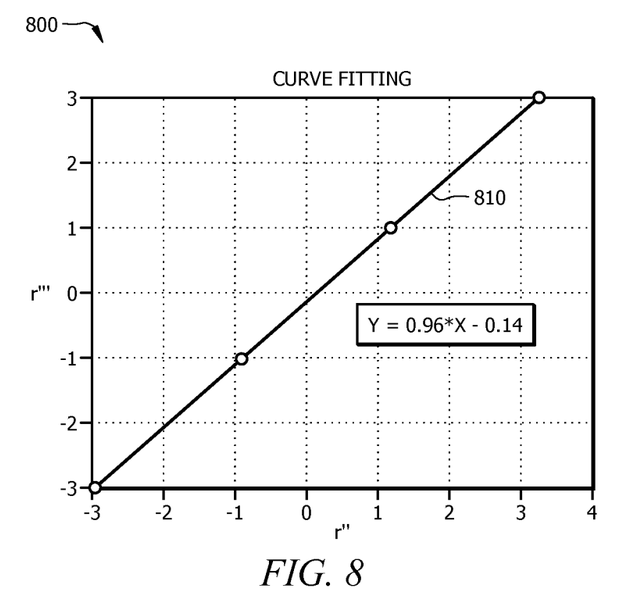
FIG. 8 illustrates an embodiment of a polynomial curve fitted over four signal level data points corresponding to the PDF of FIG. 7.

FIG. 8 is a graph 800 illustrating a polynomial curve 810 fitted over four signal level data points corresponding to the PDF of FIG. 7. The x-axis may represent average signal levels. The y-axis may represent ideal signal levels. In graph 800, the four (x, y) data points at about (−2.95, −3), about (−0.9, 1), about (1.2, 1), and about (3.25, 3) may correspond to the average signal levels of the four signal level bins in graph 700 and the ideal signal levels of the 4-AM signal. The curve 810 is a plot of a curve fitted through the four data points. In the example of graph 800, the curve 810 is fitted with a 1-degree polynomial function as shown below:

$$y = ax + b \quad (4)$$

where a is about 0.96 and b is about −0.14.

Figure 9:
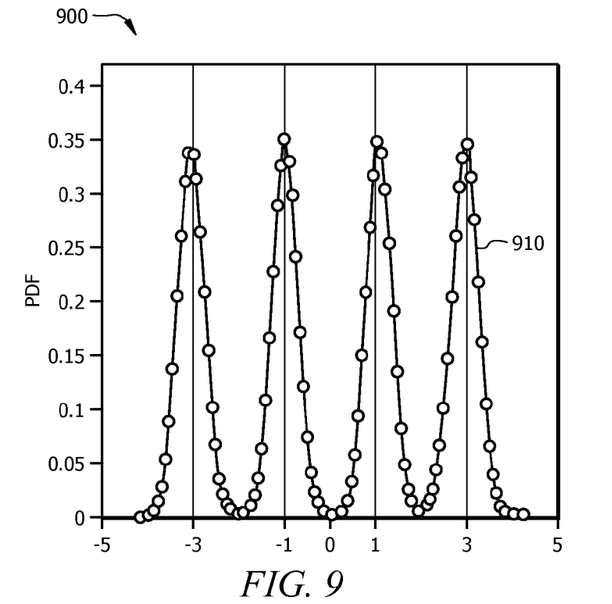
FIG. 9 illustrates an embodiment of a PDF curve of signal levels of a 4-AM signal after level equalization.

FIG. 9 is a graph 900 illustrating a PDF curve 910 of signal levels of a 4-AM signal after level equalization. The x-axis may represent signal levels of samples after level equalization. The y-axis may represent a normalized distribution of level equalized signal levels. The solid lines may represent ideal signal levels (e.g. $L_j=\{-3, -1, 1, 3\}$) of a 4-AM signal. In graph 900, the PDF curve 910 shows the PDF of signal levels of the same set of received samples as in graph 700 after applying the polynomial function shown in equation (4). As shown in graph 900, the average signal level of the level adjusted samples in each signal level bin may be about the same as the corresponding ideal signal level. As such, a slicer may be more likely to make correct decisions on the transmitted signal levels, thus reducing BER.

Figure 10:
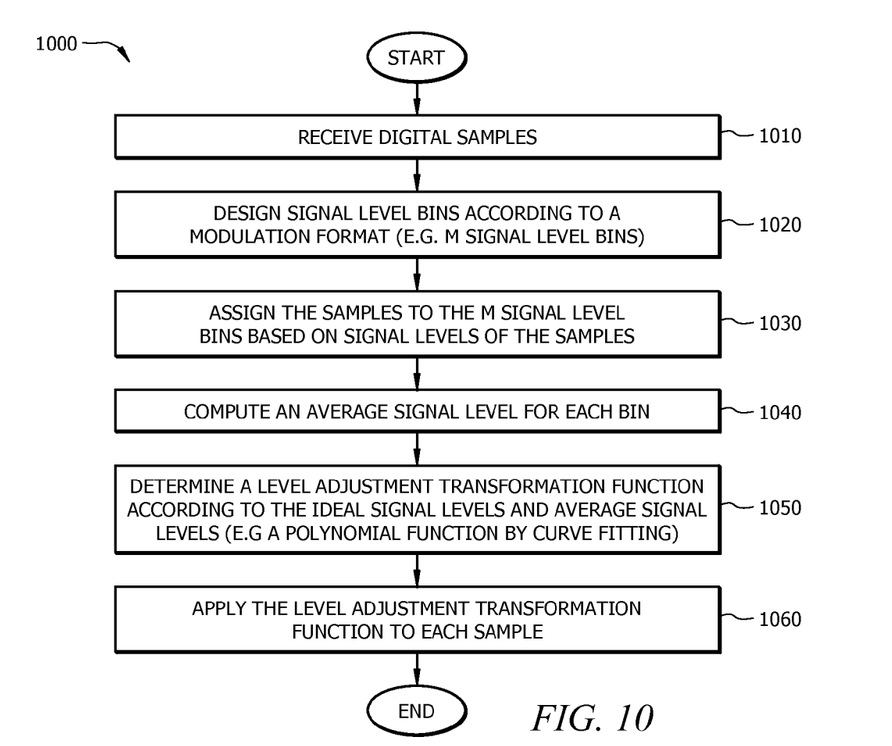
FIG. 10 is a flowchart of an embodiment of a level equalization method.

FIG. 10 is a flowchart of an embodiment of a level equalization method 1000, which may be implemented on a coherent optical receiver with a DSP-based unit, such as DSP-based TDP unit 300 or 400, or a transceiver unit, such as transceiver unit 600 described herein below with respect to FIG. 6. The method 1000 may begin with receiving digital samples at step 1010. The received samples may comprise data modulated with a designed modulation format and may be processed by an XY MIMO equalizer (e.g. XY MIMO equalizer 310 or 410), CR unit (e.g. CR unit 230, 310, or 410), and/or IQ equalizers (e.g. IQ equalizer 441 and 442). At step 1020, method 1000 may design signal level bins according to the designed modulation format. The number of signal level bins may correspond to the number of ideal signal levels (e.g. M) for the designed modulation format. The bins may be centered at about the ideal signal levels. At step 1030, method 1000 may assign the received samples to the signal level bins based on signal levels of the samples. At step 1040, method 1000 may compute an average signal level for each bin.

At step 1050, method 1000 may determine a level adjustment transformation function by performing a curve-fitting between the ideal signal levels and the computed average signal levels. For example, the level adjustment transformation function may be an $N^{th}$ degree polynomial function as described in equation (1), where the polynomial coefficients may be determined by performing a curve fitting over a set of two-dimensional data points comprising ideal signal level versus average signal level as described in equation (2). It should be noted that the curve fitting may employ a least-squares approach or any other curve fitting approaches. After the level adjustment polynomial is determined, the signal levels of the samples may be equalized by applying equation (3) in step 1060. It should be noted that method 1000 may be applied separately for each component of each polarization. In addition, the level adjustment transformation function determined from a sequence of received samples may be applied to new incoming samples and may be updated at some designed intervals. For example, the level adjustment transformation function may be updated once every S samples using the average signal levels of the S samples.

As discussed above, implementation imperfection may include limited bandwidths and non-linear responses of optical and/or electrical components at an optical transmitter and/or receiver, which may cause IQ phase deviation and/or IQ level imbalance. For example, a PM-IQ modulator, such as PM-IQ modulator 100, may require bias controls for an I data MZM, a Q data MZM, and a phase shifter. The IQ level imbalance may be caused by an offset between the I and Q data MZM bias or driving signals with imperfect amplitudes, whereas the IQ phase deviation may be caused by imperfect phase bias at the phase shifter. The effectiveness of various combinations of equalizers for BER performance improvements may be demonstrated in the following three example embodiments. In a first example embodiment, the effectiveness of IQ equalization to compensate for non-orthogonal I and Q phase angle may be demonstrated by detuning the I and Q phase bias of a PM-IQ modulator, such as the PM-IQ modulator 100, purposely at an optical transmitter. The optical transmitter may be configured to transmit a PM-16QAM signal. The PM-16QAM signal may be received by a PM-16QAM receiver comprising a XY MIMO equalizer (e.g. XY MIMO equalizer 310), IQ equalizers (e.g. IQ equalizers 441 and 442), and level equalizers (e.g. level equalizers 431, 432, 433, and 434). The XY MIMO equalizer, IQ equalizers, and level equalizers may be configured similarly as described in the DSP-based TDP unit 400. BER measurements may be taken at various stages of equalization to compare the effectiveness of the different equalizers. Table 1 lists BER measurements at various equalization stages of the PM-16QAM receiver:

TABLE 1

PM-16QAM BER measurements

| Equalization Stages | BER |
| --- | --- |
| XY MIMO equalizer | 1.79e−4 |
| XY MIMO equalizer + IQ equalizers | 6.8e−5 |
| XY MIMO equalizer + IQ equalizers + level equalizers | 3.8e−5 |

As shown in Table 1, the IQ equalizers may reduce BER as the IQ equalizers may compensate for the non-orthogonal IQ phase angle introduced by the detuning of I and Q phase bias at the PM-IQ modulator. The addition of level equalizers at the output of the IQ equalizers may provide further BER improvement by compensating for level distortions due to implementation imperfections.

In a second example embodiment, the effectiveness of level equalization to compensate for IQ amplitude imbalance may be demonstrated by detuning the I and Q MZM data bias of a PM-IQ modulator, such as the PM-IQ modulator 100, at an optical transmitter purposely, while controlling the I and Q phase angle of ninety degrees to an accuracy of about plus or minus one degree. The transmitter may be configured to transmit a PM-16QAM signal. The PM-16QAM signal may be received at three PM-16QAM receivers with different combinations of equalizers. The first receiver may comprise an XY MIMO equalizer (e.g. XY MIMO equalizer 310 or 410). The second receiver may be similar to the first receiver, but may comprise two additional IQ equalizers (e.g. IQ equalizers 441 and 442). The third receiver may be similar to the first receiver, but may comprise additional level equalizers (e.g. with equalizer structure 500) in a configuration similar to the DSP-based TDP unit 300. Table 2 lists BER measurements at the three PM-16QAM receivers:

TABLE 2

PM-16QAM BER measurements

| PM-16QAM receiver | BER |
|---|---|
| XY MIMO equalizer | 9.86e−4 |
| XY MIMO equalizer + IQ equalizers | 8.72e−4 |
| XY MIMO equalizer + level equalizers | 1.18e−4 |

As shown in Table 2, the addition of IQ equalizers may provide little BER improvement for IQ amplitude imbalance as the IQ equalizers may compensate for non-orthogonal IQ phase mismatch, while the addition of level equalizers may reduce BER significantly as the level equalizers may compensate for IQ amplitude mismatch introduced by the detuning of I and Q MZM data bias at the PM-IQ modulator.

In a third example embodiment, an optical transmitter may be configured to transmit a PM-16 Amplitude and Phase Shift Keying (PM-16APSK) signal by employing a PM-IQ modulator, such as the PM-IQ modulator 100, driven by a data generator with 4-channel RF amplifier connected to a 4-channel DAC output. The transmitted PM-16APSK signal may be received at three PM-16APSK receivers with different combination of equalizers. The first receiver may comprise an XY MIMO equalizer (e.g. XY MIMO equalizer 310 or 410). The second receiver may be similar to the first receiver, but may comprise IQ equalizers (e.g. IQ equalizers 441 and 442). The third receiver may be similar to the first and second receivers and may further comprise level equalizers (e.g. with level equalizer structure 500) in a configuration similar to the DSP-based TDP unit 400. Table 3 lists BER measurements at the three PM-16APSK receivers:

TABLE 3

PM-16APSK BER measurements

| PM-16APSK receiver | BER |
|---|---|
| XY MIMO equalizer | 2.03e−5 |
| XY MIMO equalizer + IQ equalizers | 1.78e−5 |
| XY MIMO equalizer + IQ equalizers + level equalizers | 1.21e−5 |

As shown in Table 3, the addition of IQ equalizers may partially reduce BER as the IQ equalizers may compensate for IQ phase mismatch and the addition of level equalizers may provide further BER reductions as the level equalizers may compensate for IQ amplitude imbalance, and thus may achieve the best overall BER performance. The BER reductions from level equalization shown in Tables 2 and 3 may also confirm that the two different placements of level equalizers shown in DSP-based TDP unit 300 and 400 may both improve BER performance.

Figure 11:
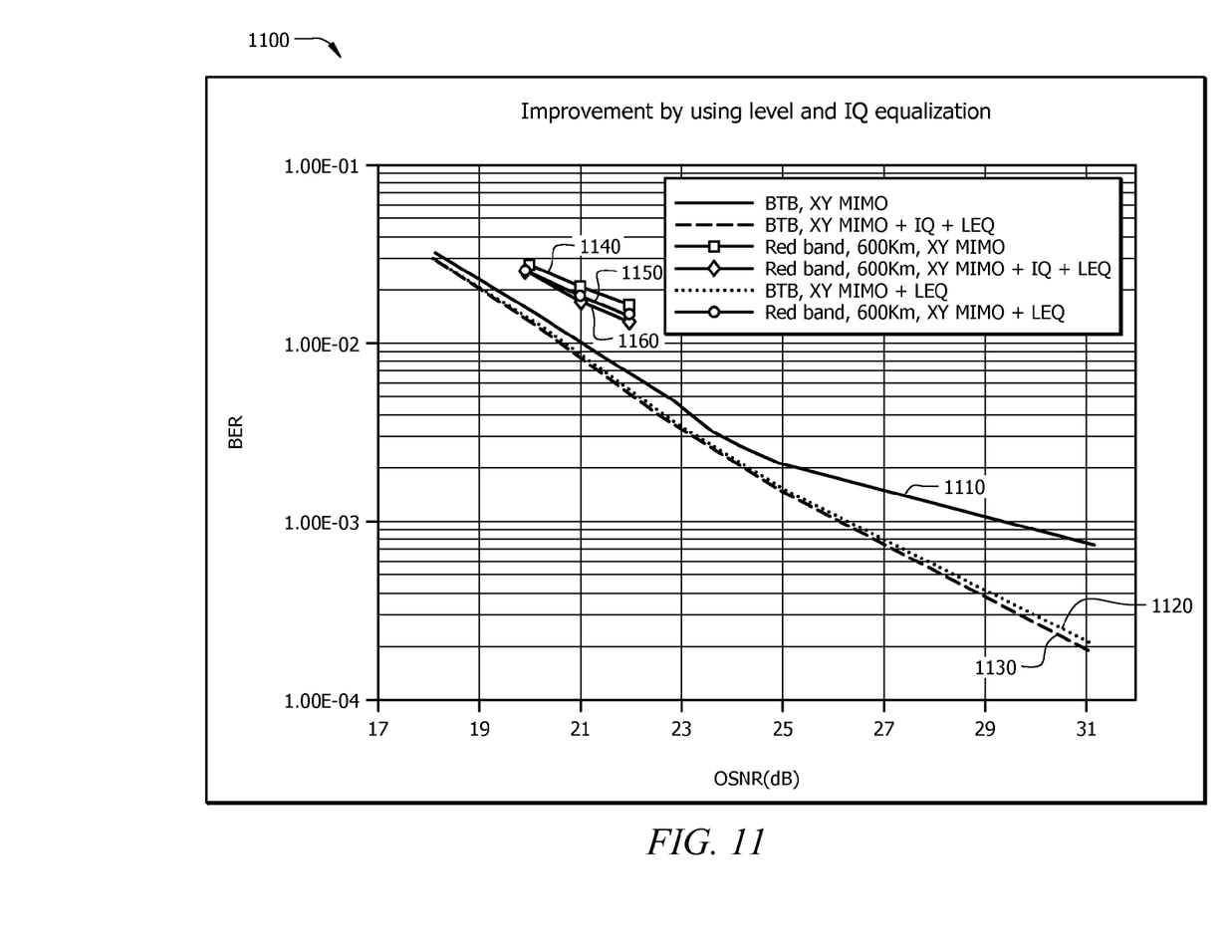
FIG. 11 illustrates an embodiment of bit error rate (BER) versus optical signal-to-noise-ratio (OSNR) curves for Polarized Multiplexed-16 Quadrature Amplitude Modulation (PM-16QAM) systems with various equalizers.

FIG. 11 is a graph 1100 illustrating BER versus OSNR curves for a PM-16QAM system with various equalizers. The x-axis may represent OSNR in units of decibel (dB). The y-axis may represent BER. The PM-16QAM system may generate a PM-16QAM signal at 28 gigabaud (Gbaud) by employing a PM-IQ modulator, such as PM-IQ modulator 100, driven by a broadband 4-channel RF amplifier connected to a high speed 4-channel DAC. The PM-16QAM signal may be detected by a polarization diversified coherent detector and recorded by a real-time digital sampling oscilloscope (DSO) for offline DSP processing with various equalizers, such as XY MIMO equalizers, IQ equalizers, and level equalizers. In graph 1100, curves 1110, 1120, and 1130 are BER measured with back-to-back (BtB) transmission (e.g. ideal transmission without fiber) and curves 1140, 1150, and 1160 are BER measured after transmission of 600 kilometer (km) of fiber. The BER curves 1110 and 1140 are measured after XY MIMO equalization. The BER curves 1020 and 1050 are measured after XY MIMO equalization and level equalization. The BER curves 1030 and 1060 are measured after XY MIMO equalization, IQ equalization, and level equalization. The curves 1110 and 1120 show that performing level equalization after XY MIMO equalization may reduce BER from about 8e-4 to about 2e-4 at low noise condition (e.g. at about 31 dB OSNR), where a transmitter performance may be most sensitive to nonlinear distortions. By comparing curves 1110 and 1120 at raw BER of about 1e-2 and curves 1140 and 1150 at raw BER of about 1e-3, performance improvements of about 0.4 dB and about 2.8 dB may be observed, respectively. As observed in FIG. 11, level equalizers may improve BER and lower error floor for both BtB transmission and transmission over 600 km of fiber, while the addition of IQ equalizers may provide little improvements.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   receiving digital samples from an optical communication system;
   assigning the samples into bins based on signal levels of the samples;
   computing an average signal level for each bin;
   determining a level adjustment transformation function for the samples based on the average signal levels of the bins;
   applying the level adjustment transformation function to the samples; and
   updating the level adjustment transformation function at intervals of a number of received samples (S) by employing average signal levels of samples received in an interval.

2. The method of claim 1, wherein the received digital samples are samples from an In-phase (I) component of a first polarization of an optical signal, a Quadrature-phase (Q) component of the first polarization of the optical signal, an I component of a second polarization of the optical signal, a Q component of the second polarization of the optical signal, or combinations thereof, and wherein the first polarization and the second polarization are orthogonal.

3. The method of claim 2, wherein the average signal levels are computed separately for each component of each polarization and the level adjustment transformation function is determined and applied separately for each component of each polarization.

4. The method of claim 1, wherein the received samples are time domain equalized samples.

5. A method comprising:
   receiving digital samples from an optical communication system;
   assigning the samples into bins based on signal levels of the samples;
   computing an average signal level for each bin;
   determining a level adjustment transformation function for the samples based on the average signal levels of the bins; and
   applying the level adjustment transformation function to the samples,
   wherein assigning the samples into the bins based on the signal levels of the samples further comprises assigning an M number of bins centered at about ideal signal levels of a modulation format with an M number of levels, and wherein the received samples comprise data modulated with the modulation format.

6. The method of claim 5, wherein determining the level adjustment transformation function for the samples based on the average signal levels of the bins comprises performing a curve-fitting between the average signal levels and the ideal signal levels.

7. The method of claim 6, wherein performing the curve-fitting between the average signal levels and the ideal signal levels comprises determining coefficients of a polynomial function that approximately fits a set of two-dimensional data points comprising the ideal signal levels versus the average signal levels.

8. The method of claim 7, wherein applying the level adjustment transformation function to the samples comprises adjusting the signal levels of the received samples by applying equation:

$$r'''(k) = \sum_{i=0}^{N} p_i \cdot (r''(k))^i$$

where $r''(k)$ is the received signal level of a $k^{th}$ received digital sample, $r'''(k)$ is the adjusted signal level of the $k^{th}$ received digital sample, $p_i$ is an $i^{th}$ coefficient of the polynomial function, and N is the degree of the polynomial function.

9. A method comprising:
   receiving digital samples from an optical communication system;
   assigning the samples into bins based on signal levels of the samples;
   computing an average signal level for each bin;
   determining a level adjustment transformation function for the samples based on the average signal levels of the bins; and
   applying the level adjustment transformation function to the samples,
   wherein the received samples are X-polarization Y-polarization (XY) Multiple-Input Multiple-Output (MIMO) equalized and In-phase Quadrature-phase (IQ) equalized samples.

10. An optical receiver comprising:
a frontend configured to:
receive an optical signal from an optical transmitter over an optical channel; and
convert the optical signal into a plurality of sequences of digital samples; and
a processor coupled to the frontend and configured to:
perform a channel equalization on the samples of the sequences;
assign the channel equalized samples of each sequence into bins based on signal levels of the channel equalized samples;
compute an average signal level in each bin for each sequence;
determine a level adjustment transformation function for each sequence based on the average signal levels of each sequence; and
perform a level equalization on each sample of each sequence by applying the level adjustment transformation function,
wherein the channel equalization comprises an X-polarization Y-polarization (XY) Multiple-Input Multiple-Output (MIMO) equalization, an In-phase Quadrature-phase (IQ) equalization, or combinations thereof.

11. The optical receiver of claim 10, wherein determining the level adjustment transformation function for the samples based on the average signal levels of the bins comprises performing a curve-fitting over a set of two-dimensional data points with the ideal signal levels against the computed average signal levels.

12. The optical receiver of claim 10, wherein each sequence comprises an In-phase (I) component of a polarization of the optical signal or a Quadrature-phase (Q) component of the polarization of the optical signal.

13. An optical receiver comprising:
a frontend configured to:
receive an optical signal from an optical transmitter over an optical channel; and
convert the optical signal into a plurality of sequences of digital samples; and
a processor coupled to the frontend and configured to:
perform a channel equalization on the samples of the sequences;
assign the channel equalized samples of each sequence into bins based on signal levels of the channel equalized samples;
compute an average signal level in each bin for each sequence;
determine a level adjustment transformation function for each sequence based on the average signal levels of each sequence;
perform a level equalization on each sample of each sequence by applying the level adjustment transformation function;
determine a number of the bins to be about equal to a number of ideal signal levels of a modulation format employed at the optical transmitter; and
center each bin at a corresponding ideal signal level.

14. The optical receiver of claim 13, wherein the number of ideal signal levels is more than about two.

15. An optical communication apparatus comprising:
a level separator coupled to a time domain equalizer and configured to:
receive a sequence of digital samples from the time domain equalizer; and
assign the samples into bins based on signal levels of the samples;
a level adjustment generator coupled to the level separator and configured to:
compute an average signal level for each bin; and
determine a level adjustment transformation function based on the average signal levels; and
a level adjustment unit coupled to the time domain equalizer and the level adjustment generator and configured to:
receive the samples from the time domain equalizer; and
apply the level adjustment transformation function to the samples.

16. The apparatus of claim 15, wherein the level separator is further configured to:
determine a number of the bins to be about equal to a number of ideal signal levels of a modulation format, wherein the received samples comprise data modulated with the modulation format; and
centering each bin to a corresponding ideal signal level.

17. The apparatus of claim 15, wherein determining the level adjustment transformation function based on the average signal levels comprises performing a least squares fit over a set of data points obtained from a plot of ideal signal levels versus the computed average signal levels.

18. The apparatus of claim 15 further comprising an In-phase Quadrature-phase (IQ) equalizer positioned between the time domain equalizer (TDEQ) and the level separator.

* * * * *